United States Patent [19]

Jones

[11] Patent Number: 4,782,798

[45] Date of Patent: * Nov. 8, 1988

[54] CYBERNETIC ENGINE

[76] Inventor: Horace L. Jones, P.O. Box 292, Manakin, Va. 23103

[*] Notice: The portion of the term of this patent subsequent to Sep. 8, 2004 has been disclaimed.

[21] Appl. No.: 48,171

[22] Filed: May 11, 1987

[51] Int. Cl.$^4$ ................................................. F01L 9/04
[52] U.S. Cl. .................................... 123/90.11; 123/414
[58] Field of Search ..................... 123/90.11, 414, 613, 123/617, 643

[56] References Cited

U.S. PATENT DOCUMENTS

| | | | |
|---|---|---|---|
| 3,548,793 | 12/1970 | Richardson | 123/90.12 |
| 3,682,152 | 8/1972 | Müller-Berner | 123/90.11 |
| 3,757,755 | 9/1973 | Carner | 123/414 |
| 3,830,207 | 8/1974 | Joseph | 123/90.11 |
| 3,882,833 | 5/1975 | Longstaff et al. | 123/90.11 |
| 4,009,697 | 3/1977 | Chateau | 123/416 |
| 4,020,803 | 5/1977 | Thuren et al. | 123/90.11 |
| 4,092,968 | 6/1978 | Stover et al. | 123/613 |
| 4,112,895 | 9/1978 | Habert | 123/414 X |
| 4,312,494 | 1/1982 | Aoyama | 251/48 |
| 4,691,672 | 9/1987 | Jones | 123/90.11 |

FOREIGN PATENT DOCUMENTS

| | | | |
|---|---|---|---|
| 2238374 | 2/1975 | France | 123/414 |
| 195004 | 11/1983 | Japan | 123/90.11 |

Primary Examiner—Tony M. Argenbright
Attorney, Agent, or Firm—Henderson & Sturm

[57] ABSTRACT

An internal combustion engine designed to enhance energy conservation and environmental pollution control with reliability and performance through the use of state-of-the-art technology. The engine incorporates a unique timing disc that allows the engine to be designed with 70% fewer moving parts, reducing both friction and weight. This in turn results in increased engine longevity with reduced maintenance. The engine is designed to increase the delivered horsepower by 40%, with less fuel consumption. The fuel delivery system is designed to create a clean burn, thereby increasing fuel efficiency; pollution and minimizing the load on pollution control systems.

7 Claims, 3 Drawing Sheets

Fig. 7

CYBERNETIC ENGINE

TECHNICAL FIELD

This invention relates to internal combustion engines and more particularly to an internal combustion engine utilizing a unique timing disc coupled with a data processor.

BACKGROUND ART

The first development of successful internal combustion engines occurred in the eighteenth and nineteenth centuries. The four stroke engine has developed as the most efficient at intaking the fuel-air mixture and exhausting the waste gases. A major disadvantage of the conventional four stroke engine is the large number of moving parts used to control the timed operation of the intake and exhaust valves. The large number of parts results in increased manufacturing and maintenance costs.

Those concerned with these and other problems recognize the need for an improved internal combustion engine.

DISCLOSURE OF THE INVENTION

The present invention provides an internal combustion engine designed to enhance energy conservation and environmental pollution control through the use of state-of-the-art technology. The engine incorporates a unique timing disc that allows the engine to be designed with 70% fewer moving parts, reducing both friction and weight. This in turn results in increased engine longevity with reduced maintenance. The engine is designed to increase the deliverd horsepower by 40%, with less fuel consumption. The fuel delivery system is designed to create a clean burn, thereby increasing fuel efficiency; decreasing pollution and minimizing the load on pollution control systems.

An object of the present invention is the provision of an improved internal combustion engine.

Another object is to provide an internal combustion engine utilizing a novel timing system that permits an engine design having substantially fewer moving parts.

A further object of the invention is the provision of an internal combustion engine that has an improved operating life.

Still another object is to provide an internal combustion engine that is inexpensive to manufacture and easy to maintain.

A still further object of the present invention is the provision of an internal combustion engine that allows for greatly improved fuel efficiency.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

The engine of the present invention is designed to have as few moving parts as possible. This reduces friction, weight, repair time, and increases efficiency. The engine used is a standard V-8 engine. The engine is stripped of intake manifold, carburetor, camshaft, push rods, tappets, intake valves, rocker arms, fuel linkage, and distributor. This leaves the crankshaft, pistons, oil pump and timing chain as the only moving parts in the block—fewer moving parts with no loss in raw horsespower or performance.

The engine heads have been modified to eliminate oil flow and circulation into the valve covers. The oil will only be used in the block of the engine. The heads are modified further to accommodate an exhaust valve only, and a direct cylinder injector, instead of an intake valve. This eliminates the need for valves, push rods, tappets, and a camshaft. The timing will be picked up from crankshaft rotations to a timing disk that will synchronize all timing of injectors and exhaust relief ports in proper sequence.

The cybernetic engine does not use a distributor. The firing of each spark plug is to be generated by signals from the processor to the power supply. The timing to fire for each cylinder is calculated by a stroke counter incorporated in the electronics of the computer. This eliminates the use of a distributor. The power supplied to each plug is advanced in proportion to the revolutions per minute under the control of the processor, insuring a cleaner burn and positive ignition.

Fuel vapor is injected into each cylinder by an electronic valve that is opened and closed for the proper duration of time. The proper sequence in time being controlled by the processor. The fuel, before being distributed through a distribution block to each cylinder, is transformed into a vapor and injected by a signal generated in the processor to open the injector of the cylinder being on the first stroke. Air is mixed with the fuel vapor through the same injector. The air is forced into the injector by an air pump. This eliminates the use of an intake manifold, carburetor, and associated linkage.

The exhaust will be routed directly from the electronically actuated exhaust port into the exhaust system. Additionally, the oxygen content of the exhaust gases are coverted to an electrical signal analogous to the air fuel ratio and utilized by the processor to further control the injector. The increase of revolutions per minute is accomplished by the accelerator or exciter. This will leave the injector valve open for a longer period of time as the exciter is depressed, thus increasing the revolutions per minute of the engine. The design of this engine will increase the horsepower and longevity of the engine. Fuel will be used to maximum efficiency—greatly increasing the estimated miles-per-gallon.

HEAD DESIGN

Figures 1, 2, 3:
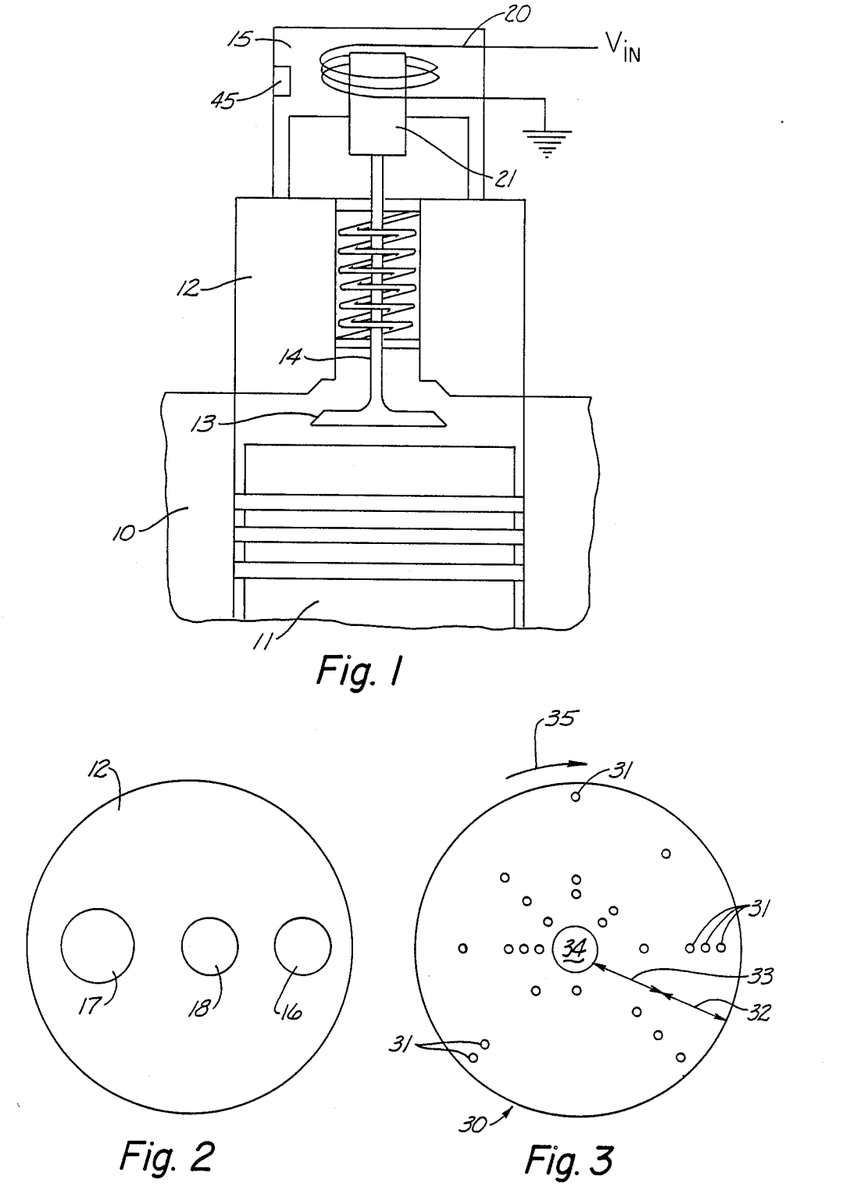
FIG. 1 is a schematic illustrating the solenoid operating exhaust valve used on the internal combustion engine of the present invention.
FIG. 2 is a schematic of the cylinder head.
FIG. 3 is a schematic showing the timing disc having firing and return elements for each of eight cylinders.

The head either being "L" type or hemispherical, has been altered to accommodate the redesigned injection and exhaust system as illustrated in FIGS. 1 and 2. The elimination of the camshaft, by the timing disc, alters the intake and exhaust valve for each cylinder. Referring now to FIG. 1, it can be seen that the block (10) carries a piston (11) and the head (12) carries only one valve (13) for each cylinder—the exhaust valve (13). This valve (13) is of the same standard valve as a conventional engine, and in the same location. The stem (14) of the valve (13) has been shortened and is actuated electronically by a solenoid (15). A coil (20) is used to effect movement of a ferrous slug (21) attached to the valve stem (14)—i.e., solenoid (15). This type of actuator for the expelling exhaust vapor eliminates the use and function of rocker arms and push-rods.

As shown in FIG. 2, the head (12) is designed without the ports for the push-rods and taps for mounting the rocker arms. The fuel intake port (16) is used instead of an intake valve. This port is machine-threaded to be one inch in diameter. The location of the port is 180 degrees out or opposite the exhaust valve port (17). The spark plug opening (18) is centrally located and the spark plug is at an angle of 30 degrees towards the intake port (16).

The injector (not shown) is mounted in the intake port (16) and is actuated electronically. The spark plug is one of conventional design. The location of the spark plug is in the center of the cylinder head in between the exhaust valve port (17) and injector port (16).

The oil ports are eliminated. There are no rocker arms that need to be lubricated. The upper portion of the exhaust valve stem (14), above the retainer, is lubricated periodically with a high-grade lubricant containing moly. This moly-base lubricant retains its viscosity under high degrees of heat. Oil ports and return ports are eliminated in the design of the head. The cooling system's water flow through the head (12) can be expanded due to the elimination of the rocker arms and valves. The design of the heads (12) incorporates a more efficient cooling system as a result. The heads (12) are pre-tapped to accommodate the mounting of solenoids (15) for the exhaust valves (13) and associated hardware.

ENGINE BLOCK AND OIL PUMP MODIFICATIONS

The engine block remains the same as any standard engine in reference to displacement, stroke, and bearings. The position and placement of the crankshaft and pistons are the same as in a conventional engine.

(1) OIL PUMP MODIFICATION

The oil pump is modified to eliminate the pumping of oil into the valve pushrods, rocker arms, and valve covers. Lubrication is not needed in these areas. Eliminated are the camshaft, tappets, pushrods, valve lifters, and rocker arms. The moving parts of the engine will consist of crankshaft, pistons, and connecting rods. Lubrication of these areas stays the same as in a standard engine. Oil is distributed to the mains, inserts, connecting rods, pistons, and cylinder walls as in a conventional engine, since timing is being picked up via the crankshaft. Lubrication is supplied to a timing chain on the front spline of the crankshaft. This chain is linked to the main timing disc. The amount of oil used is reduced due to the elimination of the need to lubricate the upper portion of the engine.

(2) BLOCK CASTING MODIFICATION (Cam, tappets, and pushrods)

The elimination of the camshaft, tappets, and valve pushrods results in a redesign in the casting of the block. The new design reduces the block's weight by 15%. This redesign also enlarges the cavity of the upper opening of the engine. Where on a standard engine the upper portion houses the camshaft, intake manifold, and carburetor, this location now carries the fuel expansion chambers and distribution block. Taps and casting for the camshaft and tappets are eliminated. New taps are drilled to accommodate the mounting of the fuel chamber, fuel pump, and associated hardware.

(3) BLOCK CASTING MODIFICATION (Cooling veins)

The elimination of valve tappets and pushrods enables the enlarging of the diameter of the cooling veins running through specified areas of the block. This insures a proper running temperature for the engine. Water veins running to the heads are redesigned to compliment the design of the heads.

EXHAUST RELIEF SYSTEM

The exhaust system is designed to eliminate the use of the camshaft, tappets, pushrods, and rocker arms. The timing of the exhaust valve (13) is under the control of the processor. Referring again to FIG. 1, the exhaust valve (13) is opened on the third stroke of the piston (11) by means of a solenoid (15). This solenoid (15) is energized by a signal from the processor. The processor senses that the piston (11) is returning from combustion (3rd stroke) and generates the signal OPEX (Open Exhaust Valve). The exhaust valve (13) stays open until the piston (11) is in the apex position of the combustion chamber. Immediately upon the piston (11) reaching the apex position, the exhaust valve (13) closed by a signal generated by the processor CLEX (Close Exhaust Valve).

The exhaust valve (13) works in the same way as an exhaust valve in a standard engine. The same valves and reliefs are used. The valve stem (14) length is shorter than that of a standard valve. The valve (13) is energized by a solenoid (15). This solenoid (15) is mounted on the head (12) over the extended end of the valve stem (14). Upon correct timing, the solenoid (15) is energized by a signal from the processor and the valve (13) is opened. The solenoid (15) is de-energized and the valve (13) closed upon the piston (11) reaching the correct position.

The exhaust vapors escape into the exhaust manifold and into the exhaust system as in a standard engine. The travel on the solenoid (15) is fixed, there is no adjustment for travel. The use of vapor instead of raw gas in the combustion chamber, results in the engine burning cleaner, with less emission than in a standard combustion engine. The need for emission controls is minimized.

TIMING DISC

FIG. 3 illustrates one embodiment of the timing disc (30). In this embodiment of the timing disc (30), is 8 and one-half inches thick. The timing disc (30) is made of a phenolic material or another suitable material having adequate strength and a low coefficient of expansion. The elements (31) are ⅛ inch diameter magnets whose material composition has been chosen to insure that with heat their magnetic field characteristics will insure the operation of the Hall effect sensors. The material can be any magnetic material that exhibits a high permability and whose magnetic field characteristics follow a classical hysterysis curve—i.e., ferrite, all classes of Alnico, all rare earth elements, and derivations of same (Neodenium, magna-Quench). These elements (31) are positioned on the timing disc (30) giving reference to the positions of each piston (11). The engine is a four stroke engine. The timing disc elements (31) are positioned to read the firing order of each cylinder. Four elements (31) are used to accommodate eight cylinders through a binary count. The firing order elements (31) are located on the outer-side (32) of the timing disc (30). The number one element (31) is one-half inch from the outer edge of the disc (30). Each element (31) is one-fourth inch distant from the next element (31). The four elements (31) will extend 1¾ inches into the center of the timing disc (30).

Extending further inward on the innerside (33) of the timing disc (30) is the return element (31). There are four return elements (31), they continue in-line from the first four firing elements (31), and are equi-distant apart and spaced every forty-five degrees (45 degrees). This allows for a one-half inch distance before reaching the spline shaft (34).

As most clearly shown in FIG. 3, the elements (31) are one-half inch from the outer edge and extend inward to within one-half inch from the inner edge of the timing disc. The elements (31) are in a binary configuration.

The following are examples of how the elements (31) count the strokes. In these examples, the firing order is set as 1, 8, 4, 3, 6, 5, 7, 2. The rotation of the timing disc (30) is clockwise, as indicated by the directional arrow (35). When the elements (31) corresponding to the number one (1) cylinder and aligns with the Hall sensor, the sensor is triggered; a signal is generated and sent to the processor. This signal indicates that the number (1) cylinder is in the upper-most position.

Figure 6A:
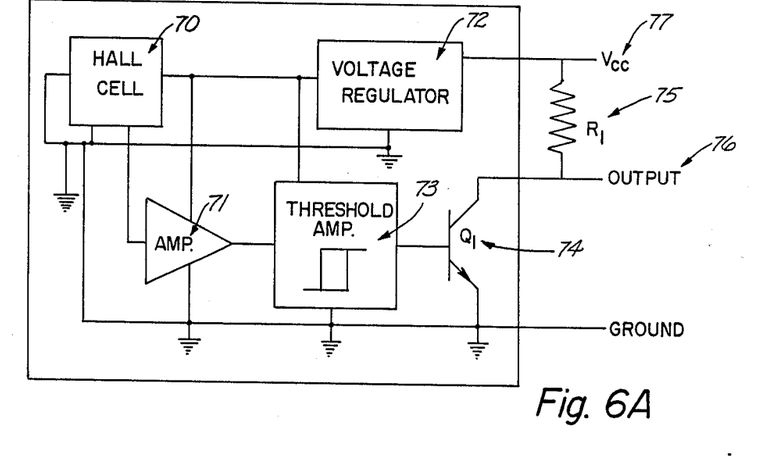
FIG. 6A is an electrical block diagram illustrating a digital Hall switch utilizing an output compatible with standard logic.
Figure 6B:
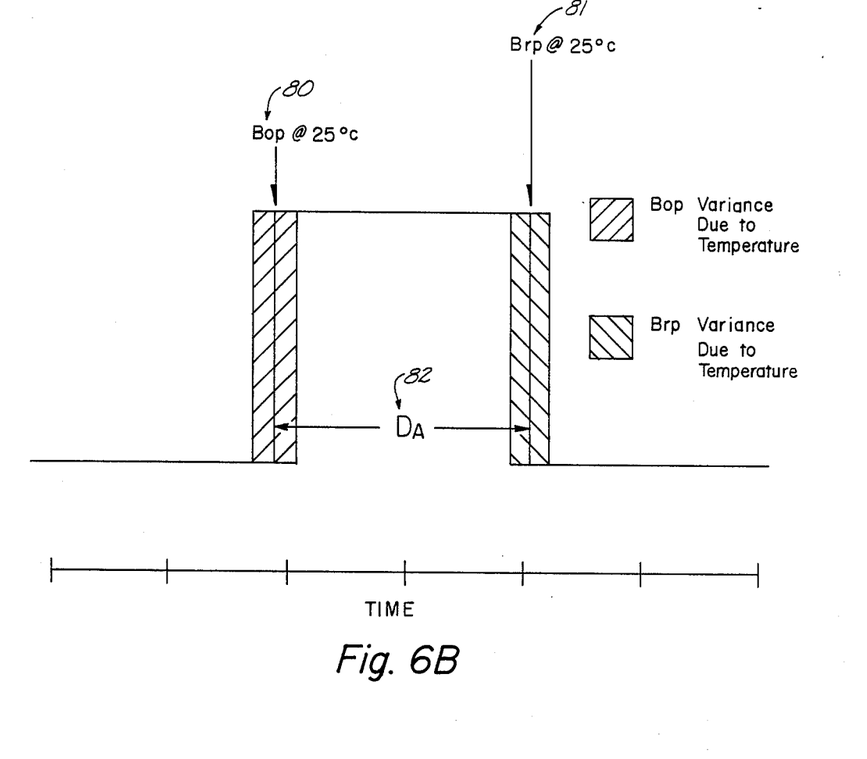
FIG. 6B is a schematic illustrating the magnetic operate point (BOP) and the magnetic release point (BRP)

Referring to FIG. 6A and 6B, as the element (31) (FIG. 3) approaches Hall sensor (45) (FIG. 4), a voltage is generated by Hall cell (70) (FIG. 6A) which is proportional to the field strength of element (31) (FIG. 3), this voltage is then amplified by amplifier (71) (FIG. 6A). When this voltage exceeds the threshold voltage of threshold amplifier (73) (FIG. 6A), the amplifier causes Q1 (74) (FIG. 6A) to conduct. With Q1 conducting current flow through R1 (75) (FIG. 6A) is then allowed causing the voltage at output (76) (FIG. 6A) to be dropped to approximately ground potential. This transition is termed magnetic operate point (BOP) (80) (FIG. 6B). The level of this transition is controlled through the voltage potential at VCC (77) (FIG. 6A) and the value of resistor R1 (75) (FIG. 6A). The deactivation is caused by the inverse of the above, i.e., element (31) (FIG. 3) moves away from hall sensor (45) (FIG. 4) causing the voltage in Hall cell (70) (FIG. 6A) to decrase effectively lowering output voltage of amplifier (73) (FIG. 6A) thereby causing transistor (74) (FIG. 6A) to cease conducting. This transition is termed magnetic release point (BRP) (81) (FIG. 6B).

The device illustrated in FIG. 6A is a SPRAGUE ELECTRIC UGN-3050 or similar device. Devices of this generic type are available off-the-shelf from Sprague Electrics, Seimens, Micro Switch, TRW, and Texas Instruments.

The binary configurations illustrated in FIG. 3 are as follows:

| EXAMPLE 1 | EXAMPLE 2 | EXAMPLE 3 | EXAMPLE 4 |
|---|---|---|---|
| 1 = 0 | | | 1 = 0 |
| | | | 2 = 0 |
| | | 4 = 0 | |
| | 8 = 0 | | |
| No. 1 Cylinder | No. 8 Cylinder | No. 4 Cylinder | No. 3 Cylinder |

As the timing disc (30) rotates, the first element aligns with the sensor. (See example 1). Example 2 shows the fourth element aligned with the sensor, causing the sensor to generate a signal indicating number eight (8) cylinder; this signal is sent to the processor. Example 3 shows the next cylinder, in the firing order, to arrive at the upper-most position to be cylinder number four (4). Element number three aligns with the sensor triggering the sensor, sending a signal to the processor for cylinder number four (4). In example 4, the next cylinder in the firing order is cylinder number three (3). When the first and second elements align with the sensor and triggers the sensor, the signal for cylinder number three (3) is sent to the processor.

The following examples further explain the binary concepts used in counting out cylinder position and order of the firing elements located on the outer side (32) of the timing disc (30). The plus sign (+) represents an element or elements aligned with the sensors. The minus sign (−) indicates no element is present on the timing disc (30) at the indicated location.

| FIRING ORDER 1, 8, 4, 3, 6, 5, 7, 2 | | | |
|---|---|---|---|
| CYLINDER NO. 1 | CYLINDER NO. 8 | CYLINDER NO. 4 | CYLINDER NO. 3 |
| 1 = + | 1 = − | 1 = − | 1 = + |
| 2 = − | 2 = − | 2 = − | 2 = + |
| 4 = − | 4 = − | 4 = + | 4 = − |
| 8 = − | 8 = + | 8 = − | 8 = − |
| 1 | 8 | 4 | 3 |
| CYLINDER NO. 6 | CYLINDER NO. 5 | CYLINDER NO. 7 | CYLINDER NO. 2 |
| 1 = − | 1 = + | 1 = + | 1 = − |
| 2 = − | 2 = − | 2 = + | 2 = + |
| 4 = − | 4 = + | 4 = + | 4 = − |
| 8 = − | 8 = − | 8 = − | 8 = − |
| 6 | 5 | 7 | 2 |

The above examples show all the elements on the outer side (32) of the timing disc (30) pertaining to the cylinder numbers. An additional set of return elements continuing from the first of four, indicate the positions of the pistons (11). Location of each piston (11) in each cylinder along with the count order for the next stroke can be determined. These elements are also used along with the firing elements to generate signals for the injectors and the exhaust valves. These elements are called return elements and are set 180 degrees outward from the firing elements. These elements are picked up by a separate sensor that sends a signal to the processor to indicate the return of a particular piston. In this manner, two strokes are counted. The following is an example of cylinder number one as it aligns with the sensor. The minus sign (−) indicates the elements are not present on the timing disc (30).

1 = + Firing Element For Cylinder Number One

-continued

```
2 = −
4 = −
8 = −
8 = −
4 = +  Return Element For Cylinder Number Six
2 = +  Return Element For Cylinder Number Six
1 = −
1 = +  Return Element For Cylinder Number One
2 = −
4 = −
8 = −
8 = −
4 = −  Firing Element For Cylinder Number Six
2 = −  Firing Element For Cylinder Number Six
1 = −
```

In FIG. 3 and the previous example, the firing element for cylinder number one is in a twelve o'clock position. Each of the eight cylinders has an element or set of elements placed at an angle of 45 degrees in relation to the next element or set of elements on the timing disc (30). Since the timing gear is in a one-to-one ratio with the crankshaft gear, each 180 degrees turn of the timing disc (30) brings that respective piston (11) half a full rotation. As the crankshaft turns one-half of a full rotation, the return elements for that piston (11) will align with the sensor and trigger the return sensor. This signal is sent to the processor to indicate the return of the second stroke. The two elements shown on the opposite outward side of the timing disc are 180 degrees out from firing elements for cylinder number six.

Also incorporated in the processor are correction coefficients to accommodate the Hall sensors main deficiency—parametric shifts with temperature. Hall technology has exhibited a temperature coefficient of 0.7 gauss per degree centrigrade this underlying characteristic has been lived with for years. This one item causes all current ignition applications to suffer from spark angle drift. This problem is further identified in FIG. 6A. All current ignition stator applications utilizing Hall technology uses the magnetic operate point (Bop) and the magnetic release point (Brp) to assimilate the signals generated from a conventional point set. As the Bop and Brp points drift with temperature, the end effect is the changing of both fire point and dwell. The processor will utilize only the Brp to trigger the subsequent timing signals within the processor. The processor will determine the duration of the signal (see FIG. 6B) (82) used to fire the spark-plug amplifier thereby controlling "dwell". Also incorporated into the processor is the ability to alter the time from signal reception to the time of amplifier firing. This variable delay is derived from both temperature and r.p.m. The temperature derivation is utilized to correct for the parametric shift associated with the Hall sensor. This application removes any error associated with the delta parameteric of Hall cells.

TIMING DISC MOUNTING

Figure 4:
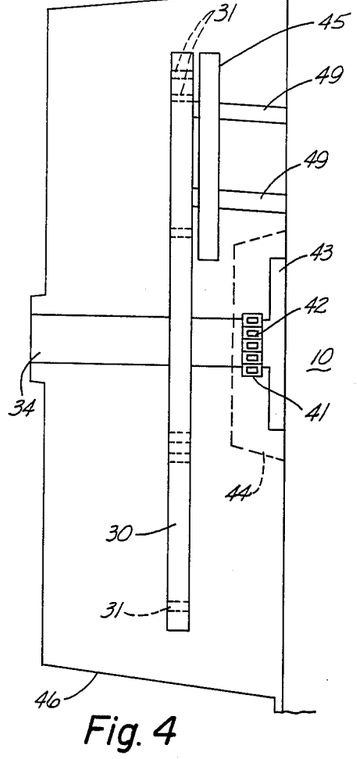
FIG. 4 is a schematic showing the mounting of the timing disc on the engine block.

Referring now to FIG. 4, the timing disc (30) is shown located on the front of the engine mounted to the front of the right head and block (10). This disc (30) is driven by a chain (41) running from the front spline of the crankshaft to the spline gear (42) located on the spindle (34) carrying the timing disc (30). The spline gear (42) on the timing spindle is spaced one-fourth inch from the spindle mounting assembly (43). The timing chain (41) and spline gears (42) are covered by a shroud (44). The spindle (34) carries an oil seal (not shown).

The gear and chain assembly will be lubricated with oil from the block. A cylindrical washer on the inside of the crankshaft spline gear (not shown) will circulate oil onto the chain (41). The chain (41) will carry the oil to the timing spline gear (42). The diameter and number of teeth of the crankshaft spline gear and timing spline gear (42) are the same, giving a one-to-one ratio.

The timing disc (30) is located one and one-half inches spaced from the face of the right head and block (10), on the timing spline (42). This allows room for the timing spline mounting (43), spline gear (42), and oil shroud (44). This one and one-half inch spacing is also the proper distance to mount the sensor (45) on mounts (49) and allows for its ease in replacement. Covering the entire assembly is the timing disc shroud (46). The sensor (47) is mounted by mounts (49) to the block (46). These components are of any materials because no active components will be located by referenced shrouds. The sensors (45) directly in the rear of the timing disc (30) are positioned one-thirty second of an inch from the face of the timing disc (30). There is an access plate (not shown) on the top of the timing shroud (40) for ease of inspection and replacement. The sensor (45) is securely mounted with no further adjustments needed. The timing assembly is completely enclosed and contamination free.

TIMING - FOUR STROKE

The time begins with the timing disc (30). When the timing disc (30) and the number one cylinder element are in front of the sensor (45) this triggers the number one cylinder sensor (45). This places the piston (11) in the number one cylinder in the up position (home position), ready for its first stroke. The sensor (45) sends a signal to the processor. This signal, 1CY1ST (Number one cylinder/first stroke), is placed into a register in the processor. The processor uses this information to accomplish several functions. First, it increments a binary counter that will give a true revolutions per minute count. Secondly, it generates a signal, OPINJ1 (Open injector number one). This signal opens the number one cylinder injector, allowing fuel vapor and an air mixture into the firing chamber, at the same time as the piston (11) is travelling downward on the first stroke. This signal OPINJ1 is A.N.D. with the signal CLINJ1 (Close injector number one). The signal CLINJ1 is generated from the accelerator. The accelerator, as it is depressed, operates a potentiometer. When the signal OPINJ1 is removed from the gate, it will close the injector of cylinder number one.

Backtracking to show the establishing of a standard by which the signal CLINJ1 is being generated in reference to the accelerator, the electronics are designed to calculate the time the injector wil remain open, generating a specific revolutions per minute reading.

The program is strapped for a maximum revolutions per minute reading, (the model will use 5,000 revolutions per minute as a maximum reading). The accelerator is used to establish an on/off division of the injector time. The accelerator being a potentiometer will establish a divisible parameter with respect to injector on, injector off, length of stroke, and revolutions per minute. The computer generates its own internal timing. For example, from the moment the injector is opened, the piston (11) is travelling downward in the cylinder. When the piston (11) reaches the bottom of the cylinder, it completes its first stroke. The timing disc (30)

will be 180 degrees out-of-phase and the return element is aligned with the sensor (45), triggering the return sensor (45). This signal is 1CY2ST (Number one Cylinder Second Stroke). There are other signals generated by this return signal to be explained in detail hereinafter. A ratio of stroke length to duration of time in revolutions per minute is thus established.

If the accelerator, a potentiometer, is depressed to fifty percent of its maximum, it will allow for only 2,500 revolutions per minute. The processor will allow the injector to remain open for a specified duration of time, allowing a predetermined amount of fuel into the combustion chamber to reach the allowed for revolutions per minute before closing the injector with the signal (CLINJ1). This signal being held low at the AND gate will terminate the signal OPINJ1. At the same time that the injector is opened to allow fuel into the chamber, a second valve is opened. This valve is part of the fuel injector and is a mixing valve. This valve allows air to be mixed with the fuel as it enters the chamber. The signal 1CY1ST generates the signal OAV1 (Open Air Valve No. 1), which is the first injector. This air valve is opened for the same duration of time as the fuel injector. The amount of air of fuel mixture is present during tune-up. This is accomplished by manually adjusting the fuel mixture until an optimum combustion ratio is reached. This air fuel ratio is set via a potentiometer which controls the reference voltage to a simple comparator. The input of this comparator is provided by an oxygen sensor whose function is detailed following. The output of this comparator is then fed to the processor indicating that the air fule ratio is at an optimum value. The software will allow for the injector signal to change whenever an output from the air fuel ratio comparator is not detected. The implementation of this control in this manner removes the need for an A.D. converter for the input to the processor as the output of the comparator is compatible with logic levels. The signal to close the air valve is CLAV1 (Close Air Valve No. 1). The signal used to close the injector is CLINJ1. These are the same signals. Their nomenclature is changed for logic purposes.

The timing disc (30) is now 180 degrees out-of-phase in relation to the start of the number one element. This increments the strode counter or flip-flops to show the second strode in progress. This signal is generated by a count of two, (via the return of the number one element), to the input AND gate. The second input of this AND gate is generated by the timing disc (30) upon the number one element becoming aligned with the sensor (45) for the second time. This triggers the sensor (45) and generates the signal 1CY3SR (No. 1 Cylinder 3rd stroke). The signal generated earlier by the return sensor and the second flip-flop being set, is 1CY2NDST (No. 1 Cylinder 2nd Stroke). The piston (11) is now in the home position. This second stroke has compressed the fuel and air mixture. Now both signals 1CY3ST with 1CY2NDST allows for passage through the AND gate and generates the signal F1CY (Fire No. 1 Cylinder). The signal F1CY will energize the current flow to the spark plug and fire the number one cylinder, this creates the third stroke.

During the piston travel of the second stroke, there were no signals generated to open the injector or the exhaust valve. As the piston (11) reaches the bottom of the cylinder, the timing disc (30) is at the number one return element for the second time. The stroke counter is incremented, also a signal OPEX1CY (Open Exhaust Valve No. 1 Cylinder), is generated. This signal is sent by the processor to the exhaust valve solenoid (15), energizing and opening the exhaust valve (13). This signal remains high until the number one element is aligned with the sensor (45) triggering the number one cylinder sensor (45), cancelling the signal OPEX1CY, or whenever an error condition is detected. This error detection is accomplished by monitoring all processor inputs and checking against a look-up table. This look-up table contains the correct input states for all cycles. This is executed for example: Hall element (45) of FIG. 1 is used to monitor current to the solenoid valve (15). Whenever the current is flowing in coil (20), a magnetic field will be developed triggering Hall element (45). If this should occur during a cycle when this valve (13) should not be activated, the processor will execute the error checking and correction routine insuring that for all cycles the engine is operating in a truly "closed loop" state.

The timing is skewed so that the closing of the exhaust valve (13) occurs prior to the injector being opened. The binary counter is reset by this signal and the cycle is restarted. Each cylinder in turn goes through the same timing sequence. This completes the sequence of events to accomplish the four strokes.

FUEL CHAMBER

Figure 5:
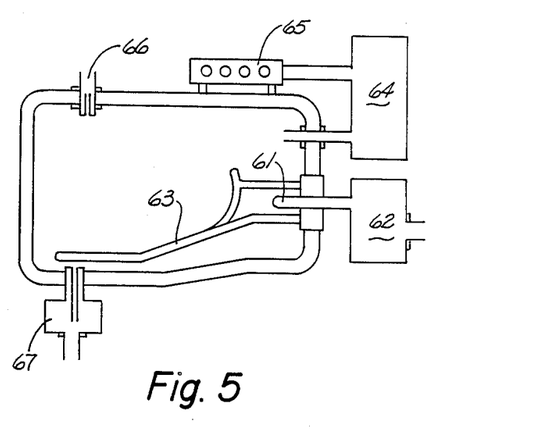
FIG. 5 is a schematic illustrating the fuel chamber used on the engine.

Referring now to FIG. 5, the fuel chamber (60) is designed to deliver gasoline in a vaporous state to the injectors (61) of each combustion chamber. Non-leaded gasoline is brought from the fuel tank by means of an electrical fuel pump (62). The fuel pump (62) is designed to spray the gasoline into the fuel chamber (60) under high pressure. The amount of fuel forced into the fuel chamber (60) is regulated to maintain a specific pressure of vaporous gasoline in the chamber (60). The fuel chamber (60) is cylindrical in design and manufactured to withstand pressures of upwards to 4,000 p.s.i. The operational range of the fuel chamber (60) is between 2,500 and 3,000 p.s.i.

The interior of the chamber (60) contains a heating element (63). This element is thermostatically controlled and is programmed to each and maintain the proper temperature of vaporous gasoline, dependent upon the octane rated gasoline used. Because the ignition temperature of vaporous gasoline is higher, a safe operating range exists for vapor boil-off to ignition. Gasoline is sprayed across the heating element (63) becoming vaporous. The chamber (60) upon reaching the desired pressure of between 2,500 to 3,000 p.s.i. causes the fuel pump (62) to cut off. As the pressure drops, the fuel pump (62) is activated, remaining on until the desired pressure is once again reached. The exit port of the fuel chamber (60) is a pressure control valve (64). This control valve (64) can be regulated to increase pressure or decrease pressure depending on the demand of the fuel required for a higher or a lower revolution per minute setting. Vapor leaving the pressure control valve (64) enters a distribution block (65) to be distributed to each combustion chamber injector. The lines to each injector are high pressure insulated lines. The injectors are processor controlled. Each injector is opened and closed in timing by a central processor. The length of time the injectors are opened is determined by the processor in direct relation to the air-fuel ratio as determined by the air-fuel ratio comparator. This allows for higher revolutions per minute settings, as the accelerator is depressed. The accelerator is controlling the fuel by means of the processor.

The fuel chamber (60) is designed with the front of the chamber floor gradually sloping downwards as shown in FIG. 5. The lower depth acts as a reservoir for recondensed fuel which occurs during periods that the engine is not in use. The front chamber floor is also used as a water trap. The heating element (63) is designed with an extension element that closely follows the contour of the chamber floor to its lowest depth. This extension element helps to vaporize any reconstituted fuel not utilized. The heating element (63) is regulated by the power supply (not shown) to maintain a specific temperature that ensures vaporization of the fuel. Located in the housing of the emergency relief valve (66) is a pressure sensor and heat sensor. For safety purposes, these are actually constructed of two sensors of opposite output potentials. This allows one sensor output to increase, while the other sensor output is decreasing these signals are both connected to the inputs of a differential amplifier and sent to the processor. This signal is utilized to detect a failure of the sensor in the following manner. If both sensors are functioning correctly, there will be no output potential from the differential amplifier, if however, one sensor should fail the amplifier will then have an output signaling a potentially hazardous error condition and shutting down the system resulting in a "fail-safe" system. The pressure and heat sensors are both monitored by the processor. Once the pressure in the fuel chamber (60) matches the pre-programmed pressure setting programmed in the processor, the heating element (63) automatically shuts off. The heating element (63) remains off until the pressure drops down to a predetermined level, at which point the heating element (63) is activated again.

Located in the fuel chamber floor is water purge sensor (67). This sensor (67) detects the presence of water that has separated from the fuel during condensation. The sensor (67) activates in the presence of water, generating a signal that is picked up by the processor. The processor generates a signal PWV (Purge Water Valve). This signal opens the water purge valve, voiding the fuel chamber (60) of the condensed water. The time duration of the water purge valve, voiding the fuel chamber (60) of the condensed water. The time duration of the water purge valve, voiding the fuel chamber (60) of the condensed water, the time duration of the water purge valve is preset for a short opening time. The valve will open for these short durations of time repeatedly until the fuel chamber (60) is completely void of water. The fuel chamber meets all safety requirements.

AIR PUMP

The air input to the combustion chamber is accomplished by means of an electrical air pump. The pump will maintain a specifically regulated pressure. The pump channels in outside air through a filtering system. The filtered air is forwarded to a distribution block. This block is designed similar to the fuel distributing block to distribute air to each injector. The cylinder injector has two exit port valves, one for the fuel vapor and the other for air. The air and fuel vapor are injected simultaneously.

The signal generated by the processor to open the number one injector for the number one cylinder, for both fuel vapor and air is OPINJ#1 (Open Injector No. 1). The signal used to accomplish this function is OPAV#1 (Open Air Valve No. 1). This function is for signal tracing purposes. The signal used to close the air injector is the same signal used to close the fuel injector CLAV#1 (Close Air Valve No. 1). The same signals are used to turn on and turn off both the fuel and air valves of the number one injector. The "on" time duration for both the air and fuel are identical. To regulate for proper burning, the mixture of air to fuel, a manual adjustment is made during tune-ups. The air port element diameter is adjustable to obtain the ideal mixture of air to fuel vapor for maximum performance. The air pump is located and mounted to the rear of the engine, for ease of maintenance.

OXYGEN SENSOR

Figure 7:
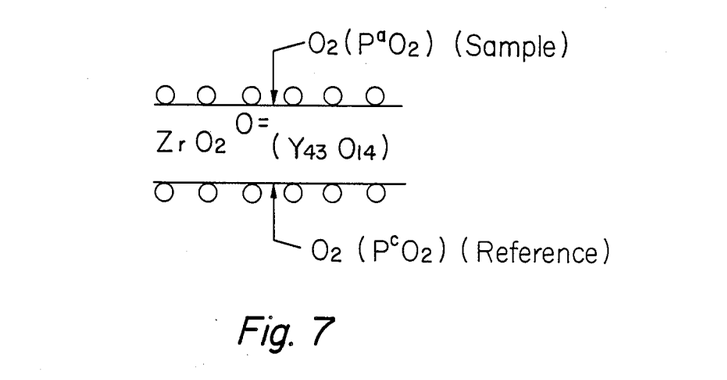
FIG. 7 is a schematic illustrating the oxygen sensor.

All oxygen sensors are derived from doped zirconium dioxide with oxides added as temperature stabilizing agents. This alloy of oxides produces solid solutions with an imperfect lattice containing ion vacancies (holes). At elevated temperatures (300 degrees centigrade ideal) this theoretical model becomes an ideal electrolyte, i.e., an electro-chemical cell reversible to oxygen concentration. (FIG. 7). The reference side of this cell is positive with respect to the sample side. The units half cell reactions are:

cathode:

anode:

therefore:
cell

The EMF of this cell follows Nert's equation:

$$E = RT/nF \, \text{Log}(e) \, (P^cO_2 \, (\text{reference})/P^aO_2(\text{sample}))$$

where:
R = Gas Constant (8.314 Joules/Mole/Degree)
F = Faradays Number (96,500 Coulombs/Farady)
n = 4 (Faradays Mole)
T = Absolute Temperature From these basic equations, it can be seen that free levels of oxygen is hot gases can be measured accurately. Doping and percentile of mixture of the compositional elements determine mid-band output. The exact formulation is chosen to yield an output compatible with standard logic levels at the stoichiometric point with either swing corresponding to lean or rich signals.

As related in the above synopsis and attached references, it can be deduced that the derivation, specification, and fabrication of yttrium stabilized zirconia sensors is well defined. This technology is available off the shelf from a number of sources.

PROCESSOR

The processor is a universal 8080 processor chip (National Semiconductor) with the associated electronics for registers and counters. The memory is an 8K dynamic RAM. The memory is expandable to accommodate for future use of additional features. A sister 8080 processor chip is used as a controller to run the IO/OP devices. The processor collects information from the various sending sensor units of the engine. This information from the various sending sensor units of the engine. This information is placed into the proper registers to be exercised by software instructions. The software instructions are permanently installed in the electronics. The instructions are a collection of PROM's (Programmable Read Only Memory). The initialization of the computer is boot-strapped, upon ignition turn on. The computer immediately comes under software control.

Information received from the sensors is utilized to generate commands which are relayed to the controller 8080 processor and distributed to the appropriate location for task performance.

The system is designed with both a plug port and position and a pre-programmed diagnostic device is attached to the port. The memory can be checked for defective core and force signals that will exercise the electronics of the system. A readout of the failing component(s) is made in this manner. This option in the existing system. The logic level used by the system is six volt on the fall. The voltage levels are generated from a filtered power supply for low level and high level logic.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

Obviously, the above teachings can be applied to all magnetic materials that conform to a classical hysterysis curve. Other sensing technologies directly implementable are variable reluctance and magneto resistive. This concept is based upon sensing variation in magnetic field intensities and can be implemented via the above sensing technologies on a purely "bolt-in" fashion.

I claim:

1. A timing mechanism adapted for use in conjunction with a four stroke internal combustion engine including a plurality of pistons disposed to reciprocate within cylinders and attached to a crankshaft in a timed sequence, each of said cylinders including a fuel-air intake and an exhaust valve; said timing mechanism comprising:
   a timing disc rotatably attached to said engine and operably attached to and rotated by said crankshaft, said timing disc including:
   a number of sets of firing order magnets attached to said timing disc each being spaced radially outward from the axis of rotation of said timing disc; and
   a number of sets of return magnets attached to said timing disc 180° outward from a corresponding set of firing order magnets;
   a hall effect sensor attached to said engine and disposed in closely spaced relationship to one side of said timing disc such that the magnetic field of said magnets is detected by said sensor; and
   means for electrically coupling said sensor to selectively operate said fuel-air intake and said exhaust valve of each of said cylinders in a timed sequence.

2. The timing mechanism of claim 1 wherein the alignment of said radially spaced set of firing order magnets with said sensor corresponds to a known position of one of said pistons within the cylinder.

3. The timing mechanism of claim 2 further including a plurality of radially spaced set of firing order magnets corresponding to each of said pistons, each of said set of firing order magnets being angularly spaced from the next adjacent magnets by an amount equal to 360 degrees divided by the total number of pistons.

4. The timing mechanism of claim 1 wherein each of said exhaust valves is a solenoid valve electronically coupled to said hall effect sensor.

5. The timing mechanism of claim 3 further including a plurality of radially spaced hall effect sensors disposed in aligned position with respect to each of said sets of firing order magnets as said timing disc rotates.

6. The timing mechanism of claim 1 wherein said sets of firing order magnets are positioned toward the outer edge of said timing disc and said sets of return magnets are positioned toward the innerside of said timing disc.

7. A timing mechanism adapted for use in conjunction with a four stroke internal combustion engine including a plurality of pistons disposed to reciprocate within cylinders and attached to a crankshaft in a timed sequence, each of said cylinders including a fuel-air intake and an exhaust valve; said timing mechanism comprising:
   a timing disc rotatably attached to said engine and operably attached to and rotated by said crankshaft, said timing disc including:
   a number of sets of firing order magnets attached to said timing disc each being spaced radially outward from the axis of rotation of said timing disc;
   a number of sets of return magnets attached to said timing disc 180° outward from a corresponding set of firing order magnets;
   a hall effect sensor attached to said engine and disposed in closely spaced relationship to one side of said timing disc such that the magnetic field of said magnets is detected by said sensor;
   means for electrically coupling said sensor to selectively operate said fuel-air intake and said exhaust valve of each of said cylinders in a timed sequence;
   each of said exhaust valves being a solenoid valve electronically coupled to said hall effect sensor;
   a monitor hall effect sensor attached to each of said solenoid valves, said monitor sensor being disposed to detect the magnetic field generated by current flowing to the solenoid valve; and
   means for electrically coupling said monitor sensor to a processor having an error checking and correction routine.

* * * * *